(12) United States Patent
Chon

(10) Patent No.: US 11,873,228 B2
(45) Date of Patent: Jan. 16, 2024

(54) METHOD OF EXTRACTING LITHIUM, METHOD OF PREPARING LITHIUM CARBONATE AND METHOD OF PREPARING LITHIUM HYDROXIDE

(71) Applicant: Uong Chon, Seoul (KR)

(72) Inventor: Uong Chon, Seoul (KR)

(*) Notice: Subject to any disclaimer, the term of this patent is extended or adjusted under 35 U.S.C. 154(b) by 0 days.

(21) Appl. No.: 17/937,586

(22) Filed: Oct. 3, 2022

(65) Prior Publication Data

US 2023/0322570 A1    Oct. 12, 2023

(30) Foreign Application Priority Data

Apr. 8, 2022 (KR) .................. 10-2022-0043946
Jul. 18, 2022 (KR) .................. 10-2022-0088189

(51) Int. Cl.
*C01D 15/02* (2006.01)
*C01D 15/08* (2006.01)
*C01B 25/45* (2006.01)

(52) U.S. Cl.
CPC .............. *C01D 15/02* (2013.01); *C01B 25/45* (2013.01); *C01D 15/08* (2013.01)

(58) Field of Classification Search
CPC ........... C22B 26/12; C22B 26/20; C22B 3/26; C01D 15/02; C01D 15/08; C01B 25/45
USPC ....................................................... 423/179.5
See application file for complete search history.

(56) References Cited

U.S. PATENT DOCUMENTS

| | | | |
|---|---|---|---|
| 8,778,289 B2 | 7/2014 | Chon et al. | |
| 2013/0129586 A1 | 5/2013 | Chon et al. | |
| 2015/0071837 A1 | 3/2015 | Chon et al. | |

FOREIGN PATENT DOCUMENTS

| | | | | |
|---|---|---|---|---|
| CN | 101942569 B | * | 3/2013 | |
| CN | 109652655 A | * | 4/2019 | ............. C22B 26/12 |
| CN | 109852797 A | | 6/2019 | |
| CN | 110683525 A | | 1/2020 | |
| JP | 2017052997 A | | 3/2017 | |
| KR | 101126286 B1 | | 3/2012 | |
| KR | 101353342 B1 | | 1/2014 | |
| KR | 101405488 B1 | | 6/2014 | |
| KR | 20200004592 A | | 1/2020 | |
| KR | 2020-0058611 A | | 5/2020 | |
| RU | 2470861 C2 | | 12/2012 | |
| RU | 2660864 C2 | | 7/2018 | |
| SU | 1712310 A1 | | 2/1992 | |

(Continued)

OTHER PUBLICATIONS

Search Report Action issued in corresponding Eurasian Patent Application No. 202292585 dated Jan. 23, 2023 (3 pages).

(Continued)

*Primary Examiner* — Melissa S Swain
(74) *Attorney, Agent, or Firm* — Osha Bergman Watanabe & Burton LLP

(57) ABSTRACT

Provided are a method of extracting lithium, which includes adding a phosphorus source material to a first solution containing a lithium cation ($Li^+$) and an alkaline earth metal cation to produce a precipitate containing lithium, magnesium, calcium, strontium, and phosphorus, wherein the total concentration of the alkaline earth metal cations in the first solution is 100,000 mg/L or more, a method of preparing lithium carbonate using the same, and a method of preparing lithium hydroxide using the same.

14 Claims, 3 Drawing Sheets

(56) References Cited

FOREIGN PATENT DOCUMENTS

| | | | |
|---|---|---|---|
| WO | 2013089400 | A1 | 6/2013 |
| WO | 2019114815 | A1 | 6/2019 |
| WO | 2019-227157 | A1 | 12/2019 |
| WO | 2021-145488 | A1 | 7/2021 |

OTHER PUBLICATIONS

Office Action issued in corresponding Eurasian Patent Application No. 202292585 dated Feb. 8, 2023 (3 pages).
Office Action issued in corresponding Australian Patent Application No. 2022268394 dated Jan. 12, 2023 (6 pages).
Office Action issued in corresponding Korean Patent Application No. 10-2022-0088189 dated Aug. 11, 2022 (9 pages).
Office Action issued in corresponding RU Application No. 2022126343 dated Oct. 18, 2022 (6 pages).

\* cited by examiner

METHOD OF EXTRACTING LITHIUM, METHOD OF PREPARING LITHIUM CARBONATE AND METHOD OF PREPARING LITHIUM HYDROXIDE

CROSS-REFERENCE TO RELATED APPLICATION

This application claims the benefit of Korean Patent Application No. 10-2022-00043946, filed on Apr. 8, 2022 and Korean Patent Application No. 10-2022-0088189, filed on Jul. 18, 2022 in the Korean Intellectual Property Office, the entire disclosures of which are incorporated herein by reference.

BACKGROUND

1. Field of the Invention

The present invention relates to a method of extracting lithium, a method of preparing lithium carbonate using the same and a method of preparing lithium hydroxide using the same.

2. Discussion of Related Art

Lithium (Li) is an essential raw material used in various industries. Lithium secondary batteries have been widely applied as power sources of IT devices such as mobile phones and laptop computers, power sources of power tools, and power sources of electric vehicles. Recently, as automobiles using lithium secondary batteries as a power source are in the spotlight, the global market demand for lithium is also rapidly increasing. Accordingly, there is an urgent need to develop a technique for efficiently extracting lithium from lithium resources.

Examples of lithium resources that are present in nature include seawater, minerals, and brine. Although seawater contains about 0.17 mg/L of lithium, it is known that the concentration is so low that it is uneconomical to extract lithium from seawater and use it industrially. Several years ago, a technique for selectively adsorbing lithium from seawater using a manganese-based adsorbent and then desorbing the same by an acid washing method was developed, but it failed to be commercialized due to low efficiency and low economic feasibility.

Examples of lithium minerals include spodumene, petalite, and lepidolite, and they contain about 1 to 1.5 wt % of lithium. However, to extract lithium, many processes such as pulverization, production of concentrate by flotation, high-temperature calcining, grinding, acid leaching, removal of impurities, lithium extraction, refining, lithium concentration, precipitation, and the like are required, so there are problems such as a high capital expenditure for production facilities and environmental pollution caused by generation of a large amount of acidic sludge.

Due to the above problems, currently, the extraction of lithium from brine present in a salt lake is most preferred. Generally, brine contains lithium as well as various chemical elements such as magnesium (Mg), calcium (Ca), strontium (Sr), aluminum (Al), silicon (Si), boron (B), sodium (Na), potassium (K), chlorine (Cl), sulfur (S), and the like. The method first developed to extract lithium from brine is a method of extracting a dissolved lithium in the form of lithium carbonate ($Li_2CO_3$). Since the concentration of lithium contained in brine is as low as 0.5 to 1.5 g/L, it is essential to concentrate the lithium by water evaporation from brine in solar pond to precipitate the dissolved lithium in the form of lithium carbonate having a high solubility of 13 g/L. Therefore, in the current solar evaporation process, lithium is concentrated from 0.5 to 1.5 g/L up to high concentration of 60 g/L. However, this process takes a long time of about 18 months. Furthermore, most of lithium is precipitated together with other elements and thus lost during the concentration process, so the efficiency of the process is very low.

In order to overcome the above problem, a method precipitating the dissolved lithium in the form of lithium phosphate ($Li_3PO_4$) with very low solubility of 0.39 g/L without high concentration of lithium was developed (Korean Registered Patent No. 10-1353342). The dissolved lithium can be easily precipitated in the form of $Li_3PO_4$ even in low concentration due to its very low solubility. Thus, the high concentration process of lithium by solar evaporation is not necessary in this method. This makes it possible to prevent the co-precipitation of lithium with other elements, resulting in serious Li-loss. In order to precipitate lithium in the form of $Li_3PO_4$, a phosphorus (P) source material is added to brine and allowed to react with lithium, but the added phosphorus preferentially reacts with impurities, such as magnesium, calcium, strontium, and the like, present in brine to produce magnesium phosphate, calcium phosphate, strontium phosphate, and the like, so lithium phosphate is not produced and precipitated. Therefore, to extract lithium in the form of lithium phosphate from brine, impurities such as calcium, magnesium, strontium, and the like need to be removed before the addition of a phosphorus (P) source material (Korean Registered Patent No. 10-1126286 and Korean Registered Patent No. 10-1405488).

An alkali such as sodium hydroxide (NaOH) or calcium hydroxide ($Ca(OH)_2$) is commonly added for removal of magnesium (Mg) from brine. The larger amount of magnesium presents, the more alkali is required. This means that cost for the Mg removal rises as the Mg content in brine increases. In addition to this, the larger amount of Mg presents, the more magnesium hydroxide ($Mg(OH)_2$) sludge is generated. This causes the separation of lithium brine from the sludge to be extremely difficult. Accordingly, the brines including large amount of Mg have been being uselessly abandoned.

Meanwhile, calcium (Ca) is removed by adding a salt such as sodium carbonate ($Na_2CO_3$) or sodium sulfate ($Na_2SO_4$). The larger amount of calcium presents, the more salt is required. This means that cost for the Ca removal rises as the Ca content in brine increases. Furthermore, the larger amount of Ca presents, the more calcium carbonate ($CaCO_3$) or calcium sulfate ($CaSO_4 \cdot 2H_2O$) sludge is generated. This causes the separation of lithium brine from the sludge to be difficult. Accordingly, the brines including large amount of Ca have also been being uselessly abandoned as with the Mg-rich brine.

For these reasons, lithium is produced only from a very few brines having the low impurity content. Therefore, to meet the rapidly increasing demand for lithium, there is an urgent need to develop a technique capable of economically and efficiently extracting lithium even from brine having the high impurity content.

There has been a series of effort to extract lithium in the form of $Li_3PO_4$, which is a poorly soluble compound having a very low solubility in water of 0.39 g/L, from brine. However, $Li_3PO_4$ is not used as a raw material for manufacturing a positive electrode material for a lithium secondary battery. Therefore, lithium phosphate needs to be converted into lithium hydroxide ($LiOH \cdot H_2O$) or lithium carbonate ($Li_2CO_3$) to be used as raw material of the positive electrode material. In order to convert lithium phosphate into lithium hydroxide or lithium carbonate, a process of dissolving lithium phosphate is essential, and a strong acid is generally used. When lithium phosphate is dissolved into a strongly acidic solution, phosphorus present in lithium phosphate is dissolved into a lithium phosphate solution. Therefore, a process of removing phosphorus using a phosphorus anion remover is essential. This complicates the process of converting $Li_3PO_4$ into $LiOH·H_2O$ and $Li_2CO_3$ and causes lithium loss, so there is a problem in that efficiency of the process is reduced.

SUMMARY OF THE INVENTION

The present invention is directed to provide a method of extracting lithium from a lithium solution by an economical, efficient, and simple method.

The present invention is also directed to provide a method of preparing lithium carbonate or lithium hydroxide from a lithium solution by an economical, efficient, and simple method.

One aspect of the present invention provides a method of extracting lithium.

The method of extracting lithium includes adding a phosphorus source material to a first solution containing a lithium cation ($Li^+$) and an alkaline earth metal cations to produce a lithium precipitate including magnesium, calcium, and phosphorus, wherein the total concentration of the alkaline earth metal cations in the first solution is 100,000 mg/L or more.

The alkaline earth metal cations may be a magnesium cation ($Mg^{2+}$), a calcium cation ($Ca^{2+}$), and a strontium cation ($Sr^{2+}$).

The first solution may further contain an alkali metal cations.

The alkali metal cations may be one or more of a sodium cation ($Na^+$) and a potassium cation ($K^+$).

The first solution may further contain cations or anions derived from one or more of iron, manganese, cobalt, silicon, aluminum, boron, chlorine, and sulfur.

The first solution may be derived from any one of brine, underground hot water, seawater, a mineral, and a waste battery.

The concentration of the lithium cation in the first solution may be 70 mg/L or more.

The lithium precipitate may further contain one or more of sodium, potassium, chlorine, and sulfur.

The phosphorus source material may be one or more selected from phosphorus, phosphoric acid, a phosphate, a hydrogen-phosphate and a phosphorus-containing solution.

The total concentration of the lithium cation ($Li^+$) and the alkaline earth metal cations in the first solution may be 100,100 mg/L or more.

The total concentration of the lithium cation, the alkaline earth metal cations, and the alkali metal cations in the first solution may exceed 100,000 mg/L.

The method may further include adding 80° C. to 100° C. water in an amount of 5 to 20 times the weight of the lithium precipitate to the lithium precipitate, stirring the slurry of the lithium precipitate for 12 hours to 60 hours and then filtering the slurry to obtain a second solution, wherein the second solution may contain the lithium cation The concentration of the lithium cation in the second solution may be 200 mg/L or more.

The method may further include adding 0.1% to 5% diluted hydrochloric acid in an amount of 5 to 20 times the weight of the lithium precipitate to the lithium precipitate at room-temperature, stirring the slurry of the lithium precipitate for 1 hour to 5 hours and then and then filtering the slurry to obtain a third solution, wherein the third solution may contain the lithium cation.

The concentration of the lithium cation in the third solution may be 200 mg/L or more.

The method may further include preparing lithium hydroxide or lithium carbonate from the second solution.

Another aspect of the present invention provides a method of preparing lithium carbonate.

The method of preparing lithium carbonate includes using the lithium precipitate of the lithium extraction method of the present invention.

Still another aspect of the present invention provides a method of preparing lithium hydroxide.

The method of preparing lithium hydroxide includes using the lithium precipitate of the lithium extraction method of the present invention.

The present invention provides a method of extracting lithium from a lithium solution by an economical, efficient, and simple method.

The present invention provides a method of preparing lithium hydroxide or lithium carbonate from a lithium solution by an economical, efficient, and simple method.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
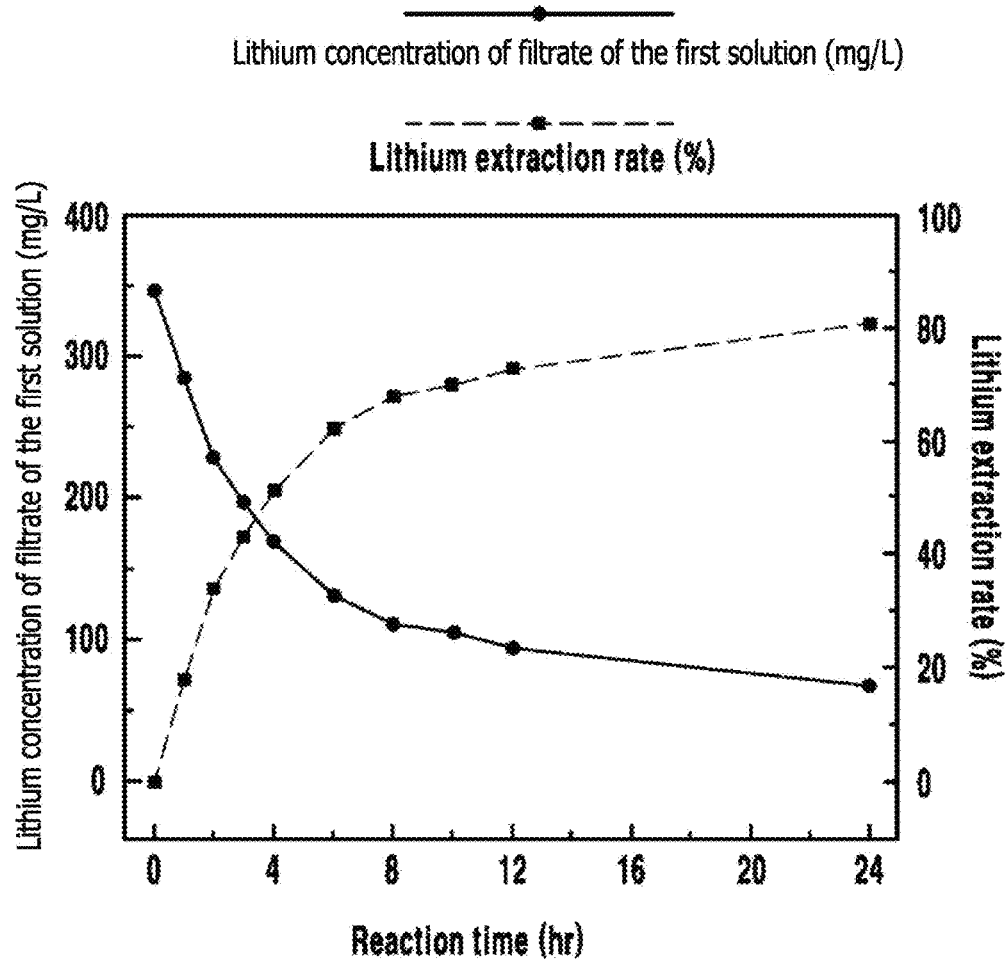
FIG. 1 shows the concentration of lithium cations remaining in the first solution and the lithium extraction rate according to a reaction time after a phosphorus source material is added to a first solution containing the impurities and lithium cations.

Hereinafter, embodiments of the present invention will be described in detail. However, the embodiments are provided as examples, and the present invention is not limited thereto and will be defined only by the scope of the claims to be described below.

As used herein, the concentration of various cations and anions may be measured by atomic emission spectroscopy, for example, inductively coupled plasma atomic emission spectroscopy (ICP-AES).

As used herein, "impurities" refer to one or more of cations and anions other than a lithium cation ($Li^+$) in a first solution.

As used herein, a "first solution" is a lithium feed solution used to extract lithium and refers to one or more of solutions directly or indirectly derived from brine, underground hot water, seawater, a mineral and a waste battery.

As used herein, "room temperature" is not particularly limited and refers to an ambient temperature at which the task is performed, for example, a temperature ranging from 0° C. to 50° C.

In the present invention, adding a phosphorus source material to a first solution containing various impurities to produce a lithium precipitate including magnesium, calcium, strontium, and phosphorus without removal of the impurities is included. The present invention, extracting lithium directly without removal of the impurities, enables the economical and efficient extraction of lithium from lithium-bearing solutions.

As described below, the lithium precipitate is a material completely different from poorly soluble lithium phosphate ($Li_3PO_4$) having very low solubility of 0.39 g/L in water. The lithium precipitate has quite different chemical composition from that of $Li_3PO_4$. Lithium phosphate ($Li_3PO_4$) has 17.98 wt % of Li and 26.75 wt % of P. The value of Li versus P ratio (Li/P) in $Li_3PO_4$ is 0.67 of 17.98/26.75. Contrary to this, the lithium precipitate has 3.7 wt % of Li and 10.4 wt % of P. The value of Li versus P ratio (Li/P) in the lithium precipitate is 0.36 of 3.7/10.4. The chemical composition of the lithium precipitate will be described below in further detail.

It also shows completely different behavior of dissolution in water from that of poorly soluble lithium phosphate ($Li_3PO_4$) when it was stirred in 90° C. water for 12 hours to 60 hours. That is, the lithium precipitate has a substantially high lithium dissolution rate as compared to poorly soluble lithium phosphate. This characteristics of the present invention enables the economical and efficient production of lithium hydroxide and lithium carbonate. The lithium dissolution rate will be described below in further detail.

In addition, according to the present invention, since a precipitate having a high lithium dissolution rate and minimized phosphorus elution is produced, lithium carbonate or lithium hydroxide can be prepared by an economical, efficient, and simple method as compared to a process of preparing lithium hydroxide or lithium carbonate from poorly soluble lithium phosphate.

Lithium is used in the form of lithium carbonate or lithium hydroxide. Accordingly, a process of converting lithium phosphate into lithium hydroxide or lithium carbonate is required. Lithium phosphate is generally dissolved into a strong acid in the conversion process. The dissolved phosphorous is essentially removed by a precipitating agent. However, as the present invention blocks or minimizes the dissolution of phosphorus from the lithium precipitate, lithium carbonate or lithium hydroxide can be prepared by an economical, efficient, and simple method without using the above-described precipitating agent of the dissolved phosphorous.

The present invention provides a method of preparing lithium hydroxide, which includes using the lithium precipitate of the lithium extraction method according to the present invention.

The present invention provides a method of preparing lithium carbonate, which includes using the lithium precipitate of the lithium extraction method according to the present invention.

Hereinafter, the present invention will be described in further detail with reference to embodiments.

(1) The method of extracting lithium according to the present invention includes adding a phosphorus source material to a first solution containing a lithium cation ($Li^+$) and an alkaline earth metal cations to produce the lithium precipitate containing magnesium, calcium, strontium, and phosphorus, wherein the total concentration of the alkaline earth metal cations in the first solution is 100,000 mg/L or more.

The concentration of the lithium cation ($Li^+$) in the first solution may be 70 mg/L or more, preferably 100 mg/L or more, and more preferably 150 mg/L or more. In an embodiment, the concentration of the lithium cation ($Li^+$) in the first solution may be 3,000 mg/L or less, 700 mg/L or less, or 500 mg/L or less, for example 70 mg/L, 80 mg/L, 90 mg/L, 100 mg/L, 110 mg/L, 120 mg/L, 130 mg/L, 140 mg/L, 150 mg/L, 160 mg/L, 170 mg/L, 180 mg/L, 190 mg/L, 200 mg/L, 250 mg/L, 300 mg/L, 350 mg/L, 400 mg/L, 450 mg/L, 500 mg/L, 550 mg/L, 600 mg/L, 650 mg/L, 700 mg/L, 900 mg/L, 1,000 mg/L, 1,500 mg/L, 2,000 mg/L, 2,500 mg/L, 3,000 mg/L.

The total concentration of the alkaline earth metal cations in the first solution is 100,000 mg/L or more. However, though total concentration of the alkaline earth metal cation in the first solution is 80,000 mg/L or more, the method of extracting lithium according to the present invention, the method of preparing lithium carbonate according to the present invention, or the method of preparing lithium hydroxide according to the present invention may also be used, depending the type or the condition of the first solution. Within the above-described range, the lithium precipitate having a substantially high lithium dissolution rate compared to that of lithium phosphate can be easily provided. From chemical composition of the lithium precipitate, it is thought that the impurities, such as the alkaline earth metal cations and the like, existing in the first solution are utilized as a medium for generation of the lithium precipitate and that the lithium cation dissolved in the first solution is extracted in the form of the lithium precipitate including alkaline earth metal cations and phosphorous.

Preferably, the total concentration of the alkaline earth metal cations in the first solution may be 100,000 mg/L to 180,000 mg/L, and most preferably, 120,000 mg/L to 180,000 mg/L, for example 100,000 mg/L, 110,000 mg/L, 120,000 mg/L, 130,000 mg/L, 140,000 mg/L, 150,000 mg/L, 160,000 mg/L, 170,000 mg/L, 180,000 mg/L. Within the above-described range, the lithium precipitate having a substantially high lithium dissolution rate compared to lithium phosphate can be easily provided. In an embodiment, the total concentration of the magnesium cation ($Mg^{2+}$), calcium cation ($Ca^{2+}$), and strontium cation ($Sr^{2+}$) in the first solution may be 100,000 mg/L to 180,000 mg/L, and preferably, 120,000 mg/L to 180,000 mg/L, for example 100,000 mg/L, 110,000 mg/L, 120,000 mg/L, 130,000 mg/L, 140,000 mg/L, 150,000 mg/L, 160,000 mg/L, 170,000 mg/L, 180,000 mg/L.

In an embodiment, the total concentration of the lithium cation ($Li^+$) and the alkaline earth metal cation in the first solution may be 100,100 mg/L or more and 300,000 mg/L or less. Within the above-described range, a precipitate having a substantially high lithium dissolution rate compared to lithium phosphate can be easily provided. Preferably, the total concentration of the lithium cation (Li+) and the alkaline earth metal cation in the first solution may be 100,100 mg/L to 250,000 mg/L, and most preferably, 100,100 mg/L to 200,000 mg/L, for example 100,100 mg/L, 110,000 mg/L, 120,000 mg/L, 130,000 mg/L, 140,000 mg/L, 150,000 mg/L, 160,000 mg/L, 170,000 mg/L, 180,000 mg/L, 190,000 mg/L, 200,000 mg/L, 210,000 mg/L, 220,000 mg/L, 230,000 mg/L, 240,000 mg/L, 250,000 mg/L, 260,000 mg/L, 270,000 mg/L, 280,000 mg/L, 290,000 mg/L, 300,000 mg/L.

In an embodiment, the total concentration of the lithium cation ($Li^+$), the magnesium cation ($Mg^{2+}$), the calcium cation ($Ca^{2+}$), and the strontium cation ($Sr^{2+}$) in the first solution may be 100,100 mg/L or more and 300,000 mg/L or less, more preferably 100,100 mg/L to 250,000 mg/L, and most preferably 100,100 mg/L to 200,000 mg/L, for example 100,100 mg/L, 110,000 mg/L, 120,000 mg/L, 130,000 mg/L, 140,000 mg/L, 150,000 mg/L, 160,000 mg/L, 170,000 mg/L, 180,000 mg/L, 190,000 mg/L, 200,000 mg/L, 210,000 mg/L, 220,000 mg/L, 230,000 mg/L, 240,000 mg/L, 250,000 mg/L, 260,000 mg/L, 270,000 mg/L, 280,000 mg/L, 290,000 mg/L, 300,000 mg/L. Within the above-described range, the lithium precipitate having a substantially high lithium dissolution rate compared to lithium phosphate can be easily provided.

The alkaline earth metal cations in the first solution may be one or more of a beryllium cation ($Be^{2+}$), a magnesium cation ($Mg^{2+}$), a calcium cation ($Ca^{2+}$), a strontium cation ($Sr^{2+}$), a barium cation ($Ba^{2+}$), and a radium cation ($Ra^{2+}$). In an embodiment, the alkaline earth metal cations in the first solution may be a magnesium cation ($Mg^{2+}$), a calcium cation ($Ca^{2+}$), and a strontium cation ($Sr^{2+}$). The method of extracting lithium according to the present invention may be well applied when all of a magnesium cation ($Mg^{2+}$), a calcium cation ($Ca^{2+}$), and a strontium cation ($Sr^{2+}$) are included as the alkaline earth metal cations.

The first solution may further contain an alkali metal cations. The alkali metal cations may be an alkali metal cations other than lithium and may be, for example, one or more of a sodium cation ($Na^+$), a potassium cation ($K^+$), a rubidium cation ($Rb^+$), a cesium cation ($Cs^+$), and a francium cation ($Fr^+$). In an embodiment, the alkali metal cation may be one or more of a sodium cation ($Na^+$) and a potassium cation ($K^+$). The method of extracting lithium according to the present invention may be well applied when both a sodium cation ($Na^+$) and a potassium cation ($K^+$) are included.

In an embodiment, the total concentration of the alkali metal cation in the first solution may be 20,000 mg/L or more, for example, 20,000 mg/L to 50,000 mg/L or 20,000 mg/L to 40,000 mg/L, for example 20,000 mg/L, 21,000 mg/L, 22,000 mg/L, 23,000 mg/L, 24,000 mg/L, 25,000 mg/L, 26,000 mg/L, 27,000 mg/L, 28,000 mg/L, 29,000 mg/L, 30,000 mg/L, 31,000 mg/L, 32,000 mg/L, 33,000 mg/L, 34,000 mg/L, 35,000 mg/L, 36,000 mg/L, 37,000 mg/L, 38,000 mg/L, 39,000 mg/L, 40,000 mg/L, 41,000 mg/L, 42,000 mg/L, 43,000 mg/L, 44,000 mg/L, 45,000 mg/L, 46,000 mg/L, 47,000 mg/L, 48,000 mg/L, 49,000 mg/L, 50,000 mg/L.

The first solution may further contain cations or anions derived from one or more of iron, manganese, cobalt, boron, silicon, aluminum, chlorine, and sulfur. In an embodiment, the first solution may include a sulfur-derived anion. The method of extracting lithium according to the present invention may be well applied when a sulfur-derived anion is included.

The total concentration of the lithium cation, alkaline earth metal cations, and alkali metal cations in the first solution may exceed 100,000 mg/L. Within the above-described range, a precipitate having a substantially high lithium dissolution rate compared to lithium phosphate can be easily provided. Preferably, the total concentration of the lithium cation ($Li^+$), alkaline earth metal cations, and alkali metal cations in the first solution may be 150,000 mg/L to 300,000 mg/L, more preferably 150,000 mg/L to 250,000 mg/L, and most preferably 150,000 mg/L to 200,000 mg/L, for example 110,000 mg/L, 120,000 mg/L, 130,000 mg/L, 140,000 mg/L, 150,000 mg/L, 160,000 mg/L, 170,000 mg/L, 180,000 mg/L, 190,000 mg/L, 200,000 mg/L, 210,000 mg/L, 220,000 mg/L, 230,000 mg/L, 240,000 mg/L, 250,000 mg/L, 260,000 mg/L, 270,000 mg/L, 280,000 mg/L, 290,000 mg/L, 300,000 mg/L. In an embodiment, the total concentration of the lithium cation ($Li^+$), magnesium cation ($Mg^{2+}$), calcium cation ($Ca^{2+}$), strontium cation ($Sr^{2+}$), sodium cation ($Na^+$), and potassium cation ($K^+$) may be 150,000 mg/L or more, preferably 150,000 mg/L to 300,000 mg/L, more preferably 150,000 mg/L to 250,000 mg/L, and most preferably 150,000 mg/L to 200,000 mg/L, for example 150,000 mg/L, 160,000 mg/L, 170,000 mg/L, 180,000 mg/L, 190,000 mg/L, 200,000 mg/L, 210,000 mg/L, 220,000 mg/L, 230,000 mg/L, 240,000 mg/L, 250,000 mg/L, 260,000 mg/L, 270,000 mg/L, 280,000 mg/L, 290,000 mg/L, 300,000 mg/L.

The phosphorus source material may be one or more selected from phosphorus, phosphoric acid, a phosphate, a hydrogen-phosphate and a phosphorus-containing solution. Specific examples of the phosphate include potassium phosphate, sodium phosphate, ammonium phosphate (specifically, the ammonium phosphate may be $(NR_4)_3PO_4$, wherein R may independently be hydrogen, deuterium, or a substituted or unsubstituted C1 to C10 alkyl group), and the like. More specifically, the phosphate may be monopotassium phosphate, dipotassium phosphate, tripotassium phosphate, monosodium phosphate, disodium phosphate, trisodium phosphate, aluminum phosphate, zinc phosphate, ammonium polyphosphate, sodium hexametaphosphate, monocalcium phosphate, dicalcium phosphate, tricalcium phosphate, or the like.

The phosphorus source material may be included in an amount of 1 mole to 4 moles based on 1 mole of the lithium cation in the first solution. Within the above-described range, the effect of the present invention can be easily implemented.

The production of the lithium precipitate may be performed by adding a phosphorus source material to a first solution and performing stirring at room temperature for 1 hour to 24 hours. As a result, the lithium precipitate containing lithium, magnesium, calcium, strontium, and phosphorus may be easily produced, and a lithium extraction rate may be high. In this case, "room temperature" does not mean a particular temperature and means a temperature without the addition of external energy. Therefore, room temperature may vary depending on a place and time. For example, room temperature may be 20° C. to 30° C. Preferably, a stirring time may be 1 hour to 12 hours. Within the above-described ranges, a lithium extraction rate can be substantially high.

In an embodiment, this step may be performed so that a lithium extraction rate of the following Equation 1 is 70% or more, for example, 70% to 100%.

$$\text{Lithium extraction rate} = A/B \times 100 \quad \text{[Equation 1]}$$

(in Equation 1,

A=Concentration of lithium cation in first solution−Concentration of lithium cation in filtrate obtained in the production of the lithium precipitate (units: mg/L), B=Concentration of lithium cation in first solution (units: mg/L))

Figure 2A:
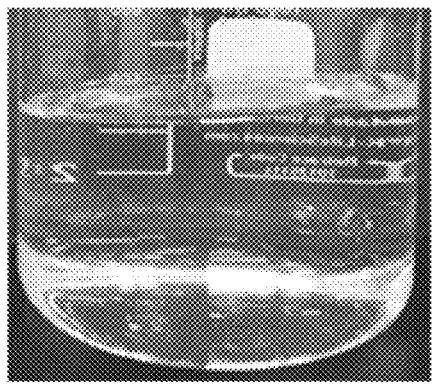
FIG. 2A shows a first solution containing the impurities and a lithium cation.
Figure 2B:
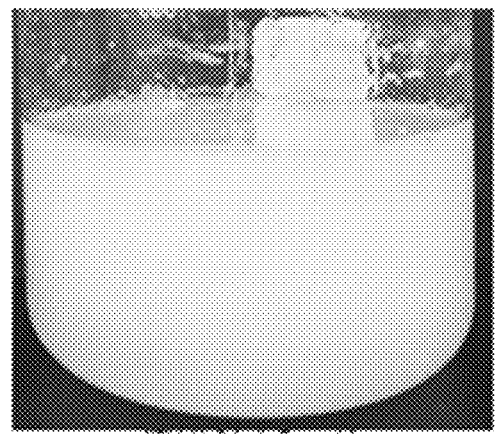
FIG. 2B shows the slurry obtained after a phosphorus source material is added to the first solution of FIG. 2A and allowed to react.
Figure 2C:
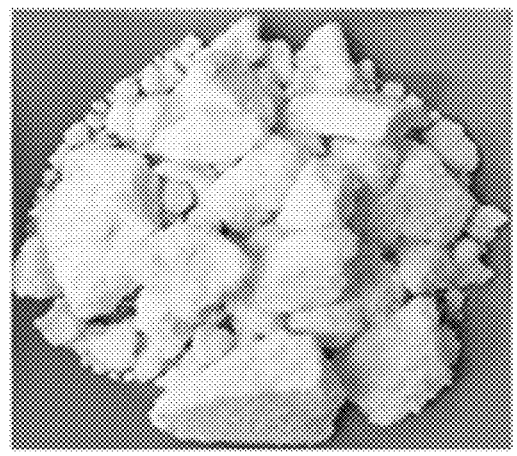
FIG. 2C shows the appearance of the lithium precipitate including magnesium, calcium, strontium, and phosphorus, which is separated from the slurry obtained after a phosphorus source material is added to the first solution and allowed to react.

Referring to FIG. 2A to FIG. 2C, a first solution is a transparent solution. On the other hand, a first solution obtained after a phosphorus source material is added to the first transparent solution and allowed to react is a white opaque slurry. Then, the opaque slurry may be filtered to produce the lithium precipitate as a white solid.

The lithium precipitate may be separated from the slurry by a typical method such as filtration from the first solution.

The lithium precipitate contains lithium, magnesium, calcium, strontium, and phosphorus. In an embodiment, the lithium precipitate may further contain one or more of sodium, potassium, chlorine, and sulfur.

(2) The method of extracting lithium according to the present invention may further include adding 80° C. to 100° C. water in an amount of 5 to 20 times the weight of the lithium precipitate to the lithium precipitate, stirring the slurry for 12 hours to 60 hours and then filtering the slurry to obtain a second solution, wherein the second solution may contain the lithium cation ($Li^+$). Within the above-described water content, water temperature, stirring time ranges, the dissolution of the lithium cation from the lithium precipitate can be facilitated. Preferably, this step may be performed by adding 85° C. to 95° C. water in an amount of 7 to 18 times the weight of the lithium precipitate to the lithium precipitate, stirring the slurry for 12 hours to 60 hours and then filtering the slurry.

The concentration of the lithium cation in the second solution may be 200 mg/L or more, for example 500 mg/L or more, 1000 mg/L or more, 10000 mg/L or less, 5000 mg/L or less, or 3000 mg/L or less, for example 500 mg/L, 600 mg/L, 700 mg/L, 800 mg/L, 900 mg/L, 1000 mg/L, 2000 mg/L, 3000 mg/L, 4000 mg/L, 5000 mg/L, 6000 mg/L, 7000 mg/L, 8000 mg/L, 9000 mg/L, 10000 mg/L.

This step may allow subsequent preparation of lithium carbonate or lithium hydroxide to be facilitated by selectively dissolving a lithium cation from the lithium precipitate. This is because the dissolution rate of a lithium cation from the lithium precipitate is high.

In an embodiment, the lithium precipitate may have a lithium dissolution rate of 60% or more, for example, 60% to 100%, when stirred in 90° C. water in an amount of 15 times the weight of the precipitate for 12 hours to 60 hours. Within the above-described range, lithium hydroxide or lithium carbonate can be easily prepared from the lithium precipitate. The lithium dissolution rate may be calculated according to the following Equation 2:

$$\text{Lithium dissolution rate} = A/B \times 100 \quad \text{[Equation 2]}$$

(in Equation 2, B=Total concentration of lithium cation contained in the lithium precipitate (units: mg/L), A=Total concentration of lithium cation in filtrate obtained by stirring the lithium precipitate in 90° C. water in an amount of 15 times the weight of the lithium precipitate for 60 hours and filtering the slurry (units: mg/L)).

In an embodiment, the lithium precipitate may have a phosphorus dissolution rate of less than 0.2% when stirred in 90° C. water in an amount of 15 times the weight of the lithium precipitate for 12 hours to 60 hours. Within the above-described range, when lithium carbonate is prepared using the lithium precipitate solution, the use of a phosphorus anion precipitating agent may not be required to remove a phosphorus anion. The phosphorus dissolution rate may be calculated according to the following Equation 3:

$$\text{Phosphorus dissolution rate} = A/B \times 100 \quad \text{[Equation 3]}$$

(in Equation 3,

B=Total concentration of phosphorus anion contained in the lithium precipitate (units: mg/L), A=Total concentration of phosphorus anion in filtrate obtained by stirring the lithium precipitate in 90° C. water in an amount of 15 times the weight of the lithium precipitate for 60 hours and filtering the slurry (units: mg/L)).

Although B in Equation 2 is not particularly limited, B may be calculated from the total concentration of the lithium cation in a solution obtained by completely dissolving the lithium precipitate in a room-temperature aqueous hydrochloric acid solution (the concentration of hydrochloric acid in the aqueous hydrochloric acid solution is 9 wt % to 15 wt %) in an amount of 15 times the weight of the lithium precipitate.

Although B in Equation 3 is not particularly limited, B may be calculated from the total concentration of the phosphorus anion in a solution obtained by completely dissolving the lithium precipitate in a room-temperature aqueous hydrochloric acid solution (the concentration of hydrochloric acid in the aqueous hydrochloric acid solution is 9 wt % to 15 wt %) in an amount of 15 times the weight of the precipitate.

In an embodiment, the lithium precipitate may have a lithium dissolution rate of 90% or more, for example, 98% to 100%, when stirred in 90° C. water in an amount of 15 times the weight of the lithium precipitate for 36 hours to 60 hours. Within the above-described range, lithium hydroxide or lithium carbonate can be easily prepared from the lithium precipitate.

(3) The method of extracting lithium according to the present invention may further include adding room-temperature 0.1 wt % to 5 wt % diluted hydrochloric acid, for example diluted hydrochloric acid aqueous solution in an amount of 5 to 20 times the weight of the lithium precipitate to the lithium precipitate, stirring the slurry for 1 hour to 5 hours and then filtering the slurry to obtain a third solution, wherein the third solution may contain the lithium cation. The concentration of the lithium cation in the third solution may be 200 mg/L or more. Lithium hydroxide or lithium carbonate may be prepared from the third solution.

(4) The method of preparing lithium carbonate according to the present invention includes using the lithium precipitate of the lithium extraction method according to the present invention.

The method of preparing lithium carbonate according to the present invention may include: obtaining the lithium precipitate of the lithium extraction method according to the present invention (step 1); adding 80° C. to 100° C. water in an amount of 5 to 20 times the weight of the lithium precipitate to the lithium precipitate, stirring the slurry for 12 hours to 60 hours and then filtering the slurry to obtain a second solution containing a lithium cation ($Li^+$) (step 2); and carbonating the second solution to prepare lithium carbonate (step 3).

Step 1 and step 2 are the substantially same as described above. Therefore, hereinafter, only step 3 will be described.

Step 3 is a step of carbonating the second solution to prepare lithium carbonate. The carbonation may be performed by adding a carbonate to the second solution or by using carbonating gas. The carbonate may be sodium carbonate ($Na_2CO_3$). The preparation of lithium carbonate using a carbonate or carbonating gas may be performed by a typical method known in the art.

In an embodiment, the method of preparing lithium carbonate according to the present invention may not include using an acid or acid aqueous solution.

(5) The method of preparing lithium hydroxide according to the present invention includes using the lithium precipitate of the lithium extraction method according to the present invention.

The method of preparing lithium carbonate according to the present invention may include: obtaining the lithium precipitate of the lithium extraction method according to the present invention (step 1); adding 80° C. to 100° C. water in an amount of 5 to 20 times the weight of the lithium precipitate to the lithium precipitate, stirring the slurry for 12 hours to 60 hours and then filtering the slurry to obtain a second solution containing a lithium cation ($Li^+$) (step 2); and adding a precipitator precipitating phosphate anion to the second solution to prepare lithium hydroxide (step 3).

Step 1 and step 2 are the substantially same as described above. Therefore, hereinafter, only step 3 will be described.

Step 3 is a step of adding a precipitator precipitating phosphate anion to the second solution to prepare lithium hydroxide. The precipitator may be an oxide or hydroxide of alkaline earth metals including Ca, Sr, Ba, Ra, Be or Mg, such as calcium hydroxide.

Hereinafter, examples of the present invention will be described in detail with reference to the accompanying drawing. However, the following examples are merely presented to exemplify the present invention, and the present invention is not limited thereto.

Example 1

As shown in the following Table 1, a brine-derived lithium solution containing impurities was prepared as a first solution.

TABLE 1

| | Chemical components | | | | | | |
|---|---|---|---|---|---|---|---|
| | $Li^+$ | $Mg^{2+}$ | $Ca^{2+}$ | $Sr^{2+}$ | $Na^+$ | $K^+$ | S |
| Content (mg/L) | 346 | 21,770 | 128,571 | 2,275 | 7,482 | 16,730 | 16 |

$Na_3PO_4$ was added in an amount of 2 moles based on 1 mole of a lithium cation in the first solution to the first solution and allowed to react while stirring at room temperature for 1 hour to 24 hours. After the reaction was completed, the resulting solution was filtered to separate the lithium precipitate in the form a solid cake, and a filtrate was collected. The lithium, magnesium, calcium, and strontium concentrations of the filtrate were measured using an atomic emission spectrometer (ICP-AES), and results thereof are shown in Table 2.

TABLE 2

| Reaction time (hr) | Concentration of chemical components of filtrate (mg/L) | | | | Lithium extraction rate (%) |
|---|---|---|---|---|---|
| | $Li^+$ | $Mg^{2+}$ | $Ca^{2+}$ | $Sr^{2+}$ | |
| 1 | 284 | 21,135 | 124,246 | 2,270 | 17.9 |
| 2 | 228 | 21,105 | 123,573 | 2,267 | 34.1 |
| 3 | 197 | 20,968 | 122,385 | 2,250 | 43.1 |
| 4 | 169 | 20,960 | 122,676 | 2,252 | 51.2 |
| 6 | 131 | 20,939 | 119,452 | 2,225 | 62.1 |
| 8 | 111 | 20,859 | 119,499 | 2,224 | 67.9 |
| 10 | 105 | 20,881 | 113,667 | 2,228 | 69.7 |
| 12 | 94 | 20,810 | 112,150 | 2,218 | 72.8 |
| 24 | 67 | 20,725 | 106,300 | 2,199 | 80.6 |

In Table 2, a lithium extraction rate was calculated by the formula (Concentration of lithium cation in first solution-Concentration of lithium cation in filtrate)×100/(Concentration of lithium cation in first solution).

As shown in Table 2, it can be confirmed that, after 24 hours of reaction, 279 mg/L corresponding to about 81% of 346 mg/L of lithium cation dissolved in the first solution was precipitated as the lithium precipitate, and thus only 67 mg/L remained in the reaction filtrate. From this result, it can be seen that lithium cations are successfully extracted from the first solution containing a large amount of impurities.

A change in the concentration of lithium dissolved in the first solution and the lithium extraction rate according to a reaction time, which are shown in Table 2, is graphically shown in FIG. 1. Referring to FIG. 1, it can be confirmed that a lithium cation concentration in the filtrate (left Y-axis) was gradually decreased according to a reaction time (X-axis), and accordingly, the lithium extraction rate was gradually increased.

The precipitate was dried at 105° C. for 24 hours, the chemical composition of the resulting lithium precipitate were measured by ICP-AES, and the weight percentage of each component in lithium precipitate is shown in Table 3.

TABLE 3

| | Chemical components | | | | |
|---|---|---|---|---|---|
| | $Li^+$ | $Mg^{2+}$ | $Ca^{2+}$ | $Sr^{2+}$ | P |
| Content (wt %) | 3.7 | 2.69 | 12.24 | 0.28 | 10.4 |

As shown in Table 3, it can be clearly seen that lithium can be successfully extracted by producing a lithium precipitate using impurities as a medium in the first solution.

Example 2

The lithium precipitate shown in Table 3 was mixed with 90° C. water in an amount of 15 times the weight of the lithium precipitate, stirred for 12 hours to 60 hours, and then filtered to obtain a filtrate as a second solution. The chemical composition of the second solution was analyzed by ICP-AES, and results thereof are shown in Table 4.

For identifying the concentrations of lithium and phosphorous upon a complete dissolution of the lithium precipitate shown in Table 3, the lithium precipitate shown in Table 3 was mixed with 9 wt % hydrochloric acid aqueous solution of 15 times the weight of the lithium precipitate and stirred. The concentrations of lithium and phosphorous of the aqueous solution were measured to be 1,879 mg/L and 5,897 mg/L, respectively through ICP-AES analysis. From this result, it was confirmed that, when the lithium precipitate was completely dissolved in 90° C. water in an amount of 15 times the weight of the lithium precipitate, the concentrations of lithium and phosphorous were 1,879 mg/L and 5,897 mg/L, respectively. These values of concentration were compared with those of the second solutions, stirred for 12 hours to 60 hours. From these comparisons, the dissolution rates of lithium and phosphorus were calculated according to Equation 2.

As shown in Table 4, it was confirmed that, when the precipitate was mixed with 90° C. water in an amount of 15 times the weight of the precipitate and then stirred for 60 hours, 98.2% of lithium contained in the lithium precipitate, that is, almost all of lithium in it, was dissolved. In other, it was confirmed that, unlike when the lithium precipitate was mixed with hydrochloric acid and stirred, when the lithium precipitate was mixed with 90° C. water in an amount of 15 times the weight of the lithium precipitate and then stirred for 60 hours, phosphorus contained in the lithium precipitate was hardly dissolved. From these results, it can be seen that, when lithium carbonate is prepared using the lithium precipitate solution, the use of a phosphorus anion precipitating agent is not required to remove a phosphorus anion. Also, it can be easily seen that, when the lithium precipitate is dissolved using a weak acid diluted using a large amount of water, lithium can be dissolved without dissolution of phosphorus even at room temperature.

TABLE 4

| Stirring time | Concentration of chemical components dissolved into second solution (mg/L) | | | | | Lithium dissolution rate | Phosphorus dissolution rate |
|---|---|---|---|---|---|---|---|
| (hr) | $Li^+$ | $Mg^{2+}$ | $Ca^{2+}$ | $Sr^{2+}$ | $P^{n-}$ | (%) | (%) |
| 12 | 1,103 | 1,517 | 586 | 16 | 9 | 58.7 | 0.15 |
| 24 | 1,262 | 1,503 | 478 | 12 | 8 | 67.2 | 0.14 |
| 32 | 1,437 | 1,516 | 425 | 11 | 9 | 76.5 | 0.15 |
| 48 | 1,582 | 1,619 | 422 | 11 | 10 | 84.2 | 0.17 |
| 60 | 1,846 | 1,796 | 444 | 11 | 11 | 98.2 | 0.19 |

Comparative Example

Figure 3:
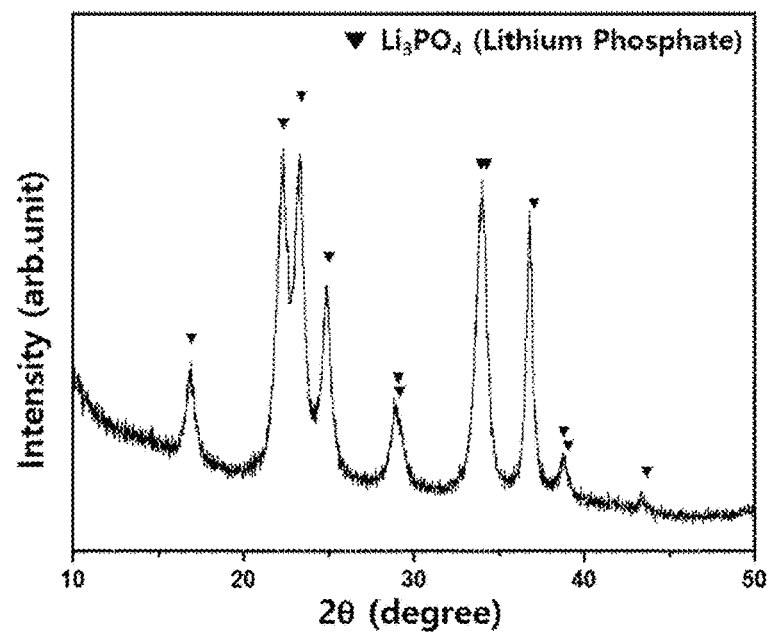
FIG. 3 shows X-ray diffraction patterns for lithium phosphate ($Li_3PO_4$)

As shown in the X-ray diffraction analysis result of FIG. 3, single-phase lithium phosphate ($Li_3PO_4$) was prepared. Lithium phosphate is a poorly soluble compound having a solubility of 0.39 g/L. Lithium phosphate was mixed with water in an amount of 15 times the weight of the lithium phosphate to prepare an aqueous lithium phosphate solution, and the aqueous solution was stirred at 90° C. for 12 hours to 60 hours and then filtered. The chemical compositions of the obtained filtrates were analyzed by ICP-AES, and results thereof are shown in Table 5.

For identifying the concentration of lithium upon a complete dissolution of lithium phosphate, lithium phosphate was mixed with 9 wt % hydrochloric acid aqueous solution of 15 times the weight of lithium phosphate and stirred. The lithium concentration of the aqueous solution was measured to be 9,739 mg/L through ICP-AES analysis. From this result, it was confirmed that, when lithium phosphate was completely dissolved in 90° C. water in an amount of 15 times the weight of lithium phosphate, the concentration of lithium was 9,739 mg/L.

Figure 4:
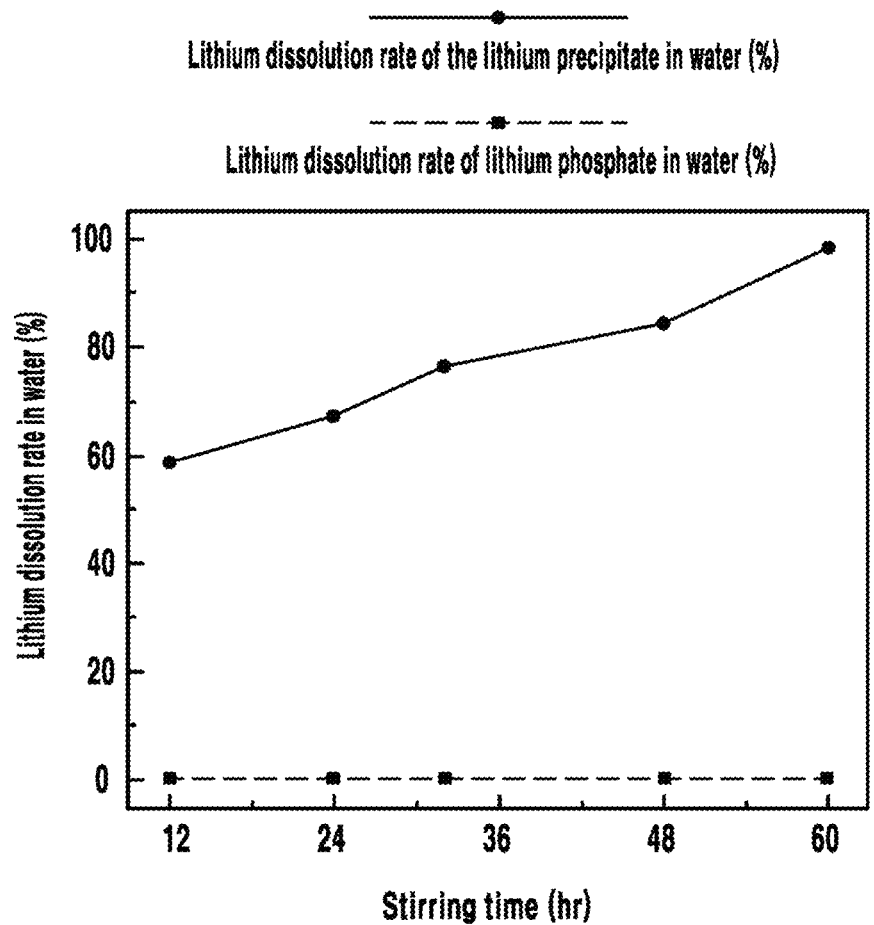
FIG. 4 shows lithium dissolution rates according to a stirring time when each of lithium phosphate and the lithium precipitate including magnesium, calcium, strontium, and phosphorus is added to 90° C. water and then stirred for 12 hours to 60 hours.

These values of concentration were compared with those of the second solutions, stirred for 12 hours to 60 hours. From these comparisons, the dissolution rate of lithium were calculated according to Equation 2. Results thereof are shown in Table 5 and FIG. 4.

TABLE 5

| Stirring time | Concentration of chemical components dissolved into aqueous solution including $Li_3PO_4$ (mg/L) | | | | Lithium dissolution rate (%) |
|---|---|---|---|---|---|
| (hr) | $Li^+$ | $Mg^{2+}$ | $Ca^{2+}$ | $Sr^{2+}$ | |
| 12 | 22 | 0 | 0 | 0 | 0.2 |
| 24 | 22 | 0 | 0 | 0 | 0.2 |
| 36 | 22 | 0 | 0 | 0 | 0.2 |
| 48 | 22 | 0 | 0 | 0 | 0.2 |
| 60 | 23 | 0 | 0 | 0 | 0.2 |

As described above, lithium phosphate is a typical poorly soluble material having a solubility of 0.39 g/L in water. As shown in Table 5, even when lithium phosphate is stirred in water for 60 hours, it has a very low lithium dissolution rate of 0.2%. This is significantly different from that the lithium precipitate has a high dissolution rate of 98.2% under similar condition. These experimental results clearly show that the lithium precipitate of the present invention is a material having physicochemical properties completely different from those of poorly soluble lithium phosphate ($Li_3PO_4$). Therefore, from Example 2 and Comparative Example, it is shown that the lithium precipitate extracted from a lithium solution according to the present invention is not a generally known poorly soluble lithium phosphate having a solubility of 0.39 g/L. Also, it is obvious that the lithium dissolution behavior of the lithium precipitate and lithium phosphate in aqueous solutions are significantly different as shown in Table 5 and FIG. 4.

The present invention is not limited to the embodiments described herein and may be embodied in other forms, and it will be understood by those skilled in the art to which the invention pertains that the present invention can be implemented in other specific forms without changing the technical spirit or essential features of the present invention. Therefore, it should be understood that the embodiments described above are only exemplary in all aspects and not limiting.

What is claimed is:

1. A method of extracting lithium, comprising:
    adding a phosphorus source material to a first solution containing a lithium cation ($Li^+$) and an alkaline earth metal cation to produce a lithium precipitate containing magnesium, calcium, strontium, and phosphorus,
    wherein the alkaline earth metal cation in the first solution is a magnesium cation ($Mg^{2+}$), a calcium cation ($Ca^{2+}$), and a strontium cation ($Sr^{2+}$),
    wherein phosphorus source material is included in an amount of 1 mole to 4 moles based on 1 mole of the lithium cation in the first solution,
    wherein the lithium precipitate has a lithium dissolution rate of 60% or more, when calculated according to Equation 2:

$$\text{Lithium dissolution rate} = A/B \times 100 \qquad \text{(Equation 2)}$$

wherein B=Total concentration of lithium cation contained in the lithium precipitate (units: mg/L), A=Total concentration of lithium cation in filtrate obtained by stirring the lithium precipitate in 90° C. water in an amount of 15 times the weight of the lithium precipitate for 60 hours and filtering the slurry (units: mg/L)), and
    wherein the total concentration of the alkaline earth metal cations in the first solution is 100,000 mg/L or more.
2. The method of claim 1, wherein the first solution further contains alkali metal cations.

3. The method of claim 2, wherein the alkali metal cations are one or more of a sodium cation ($Na^+$) and a potassium cation ($K^+$).

4. The method of claim 2, wherein the first solution further contains cations derived from one or more of iron, manganese, cobalt, boron, silicon, aluminum, chlorine, and sulfur.

5. The method of claim 1, wherein the first solution is derived from any one of brine, underground hot water, sea water, a mineral, and a waste battery.

6. The method of claim 1, wherein the concentration of the lithium cation in the first solution is 70 mg/L or more.

7. The method of claim 1, wherein the lithium precipitate further contains one or more of sodium, potassium, chlorine, and sulfur.

8. The method of claim 1, wherein the phosphorus source material is one or more selected from phosphorus, phosphoric acid, a phosphate, a hydrogen-phosphate and a phosphorus-containing solution.

9. The method of claim 1, wherein the total concentration of the lithium cation ($Li^+$) and the alkaline earth metal cations in the first solution is 100,100 mg/L or more.

10. The method of claim 1, further comprising adding 80° C. to 100° C. water in an amount of 5 to 20 times the weight of the lithium precipitate to the lithium precipitate, stirring a slurry of the lithium precipitate for 12 hours to 60 hours and then filtering the slurry to obtain a second solution, wherein the second solution contains the lithium cation.

11. The method of claim 10, wherein the concentration of the lithium cation in the second solution is 200 mg/L or more.

12. The method of claim 1, further comprising adding 0.1 wt % to 5 wt % diluted hydrochloric acid in an amount of 5 to 20 times the weight of the lithium precipitate at room-temperature to the lithium precipitate, stirring a slurry of the lithium precipitate for 1 hour to 5 hours and then filtering to obtain a solution containing the lithium cation.

13. The method of claim 12, wherein the concentration of the lithium cation in the third solution is 200 mg/L or more.

14. The method of claim 10, further comprising preparing lithium hydroxide or lithium carbonate from the second solution.

* * * * *